United States Patent
Lee (10) Patent No.: US 10,841,783 B2
(45) Date of Patent: Nov. 17, 2020

(54) METHOD AND APPARATUS FOR DATA COMMUNICATION USING BLUETOOTH LOW ENERGY

(71) Applicants: SHIN HEUNG PRECISION CO., LTD, Anseong-si, Gyeonggi-do (KR); MANGOSLAB CO., LTD., Seongnam-si, Gyeonggi-do (KR)

(72) Inventor: Sang Bong Lee, Seoul (KR)

(73) Assignees: SHIN HEUNG PRECISION CO., LTD, Anseong-si (KR); MANGOSLAB CO., LTD., Seongnam-si (KR)

( * ) Notice: Subject to any disclaimer, the term of this patent is extended or adjusted under 35 U.S.C. 154(b) by 0 days.

(21) Appl. No.: 16/488,265

(22) PCT Filed: Mar. 26, 2018

(86) PCT No.: PCT/KR2018/003550
§ 371 (c)(1),
(2) Date: Aug. 23, 2019

(87) PCT Pub. No.: WO2018/182261
PCT Pub. Date: Oct. 4, 2018

(65) Prior Publication Data
US 2020/0008040 A1    Jan. 2, 2020

(30) Foreign Application Priority Data

Mar. 28, 2017   (KR) .......................... 10-2017-0039034

(51) Int. Cl.
*H04W 8/00* (2009.01)
*H04L 5/00* (2006.01)
(Continued)

(52) U.S. Cl.
CPC ........... *H04W 8/005* (2013.01); *H04L 5/0055* (2013.01); *H04L 61/6022* (2013.01); *H04W 4/80* (2018.02); *H04W 76/15* (2018.02); *H04W 76/30* (2018.02)

(58) Field of Classification Search
CPC ..... H04W 8/005; H04W 76/15; H04W 76/30; H04W 4/80; H04L 5/0055; H04L 61/6022
(Continued)

(56) References Cited

U.S. PATENT DOCUMENTS

2014/0323048 A1*  10/2014  Kang ...................... H04W 4/80
                                                              455/41.2
2016/0262193 A1    9/2016  Hariharan
2017/0289787 A1*  10/2017  Yu ......................... H04W 76/14

FOREIGN PATENT DOCUMENTS

KR             10-0379836 B1    4/2003
KR        10-2014-0135569 A    11/2014
(Continued)

*Primary Examiner* — Lee Nguyen
(74) *Attorney, Agent, or Firm* — Novick, Kim & Lee, PLLC; Jae Youn Kim; Jihun Kim (57) ABSTRACT

A method for performing communication with a data device by a terminal supporting Bluetooth connection of a first profile and a second profile is provided, which includes transmitting a media access control (MAC) address of the terminal to the data device having established a first connection in the first profile with the terminal; disconnecting the first connection; receiving, from the data device, a request for a second connection in the second profile through the MAC address of the terminal; identifying the data device using pre-registered first information; and establishing the second connection without transmission of an acknowledgment for the second connection.

8 Claims, 4 Drawing Sheets

(51) Int. Cl.
    *H04W 76/15*     (2018.01)
    *H04W 76/30*     (2018.01)
    *H04W 4/80*     (2018.01)
    *H04L 29/12*     (2006.01)

(58) Field of Classification Search
    USPC .......................................................... 455/41.2
    See application file for complete search history.

(56) References Cited

FOREIGN PATENT DOCUMENTS

| | | |
|---|---|---|
| KR | 10-2016-0071826 A | 6/2016 |
| KR | 10-2016-0112314 A | 9/2016 |

\* cited by examiner

METHOD AND APPARATUS FOR DATA COMMUNICATION USING BLUETOOTH LOW ENERGY

TECHNICAL FIELD

The present disclosure relates to a method and an apparatus for transmitting data of a predetermined capacity or over to a data device using Bluetooth low energy (BLE). Specifically, the present disclosure relates to a method and an apparatus for transmitting and receiving data in a Bluetooth classic (BT classic: existing Bluetooth) mode by transmitting a media access control (MAC) address to a data device in a BT classic mode of a terminal through a connection in a BLE mode and then by enabling the data device to make a forced connection with the terminal in the BT classic mode through the MAC address of the terminal.

BACKGROUND ART

Bluetooth uses IEEE 802.15.1 standards that correspond to industrial standards for personal area networks (PANs) in wireless communication, and it enables various devices to communicate with one another using radio frequencies that can be safely used at low costs throughout the world.

Bluetooth uses 2.45 GHz that is an ISM band, and it has been developed through addition of new functions, such as Version 1.1, 1.2, 2.0+EDR (Enhanced Data Rate), 2.1+EDR, 3.0+HS (High Speed), 4.0, and 4.1. Starting from Bluetooth 4.0, a new protocol stack of Bluetooth low energy (BLE) has been proposed.

A chip that supports only BLE is called a single mode, and it supports only unidirectional transmission. As described above, a product mounted with BLE is called Bluetooth smart. A chip with BT classic is called a dual mode, and it supports bidirectional transmission. A product mounted with BT classic is called Bluetooth smart ready.

In accordance with iOS operating system iAP (iPod Accessory Protocol) rules of Apple Inc., an operation protocol of a peripheral device connected to a device using the iOS operating system is determined. In accordance with the iAP protocol, BLE can have device access, such as connection and disconnection, even on an application installed in a smart phone. However, BLE is unable to have a communication speed that is equal to or higher than a predetermined speed, and thus it has disadvantages that it is not easy to transmit data of a predetermined capacity or over. In contrast, according to the iAP protocol, in the BT classic mode in the iOS, an application installed in a smart phone is unable to have access with respect to a control, such as connection and disconnection, caused by the OS (Operating System) design in consideration of security, but it is able to have access only for system setting. However, because the BT classic has a higher communication speed than the communication speed of BLE, it has advantages that it is easy to perform data transmission of the predetermined capacity or over.

In order for a smart phone using the iOS to quickly transmit data of the predetermined capacity or over through Bluetooth communication, BT classic mode connection is necessary. However, if an iOS user is unable to control a connection with a data device, transmission and reception of necessary data, and quick disconnection through an application, but is able to control a connection and a disconnection in the BT classic mode between the smart phone using the iOS and the data device through one-by-one system setting, it may cause great inconvenience in use.

Accordingly, there is a need for development of a technology capable of controlling a connection and a disconnection in the BT classic mode in order for the application installed in the smart phone to transmit and receive data of a predetermined capacity or over through Bluetooth communication with the data device in spite of the OS design limits in the smart phone using the iOS.

DETAILED DESCRIPTION OF INVENTION

Technical Problem

An aspect of the present disclosure is to provide a terminal and a data device supporting both BLE and BT classic, which can perform Bluetooth transmission and reception of data of a predetermined capacity or over that is not easily transmitted through a BLE connection from the terminal to the data device through an iOS application capable of controlling only the BLE connection of the terminal.

Another aspect of the present disclosure is for an iOS application to control a BT classic connection between a terminal and a data device as a result of forcing the data device to make the BT classic connection with the terminal through the BLE connection through the iOS application capable of controlling only the BLE connection of the terminal.

Technical Solution

In accordance with an aspect of the present disclosure, a method by a terminal supporting Bluetooth connection of a first profile and a second profile for performing communication with a data device includes transmitting a media access control (MAC) address of the terminal to the data device having established a first connection in the first profile with the terminal; disconnecting the first connection; receiving, from the data device, a request for a second connection in the second profile through the MAC address of the terminal; identifying the data device using pre-registered first information; and establishing the second connection without transmission of an acknowledgment for the second connection.

Preferably, the first profile may be Bluetooth low energy that does not support transmission and reception of data at a predetermined speed or over, and the second profile may be classic Bluetooth that supports the transmission and the reception of the data at the predetermined speed or over.

The method may further include performing the transmission and reception of the data with the data device after establishing the second connection.

The method may further include searching for the data device in the first profile before transmitting the MAC address of the terminal to the data device; transmitting a request for the first connection in the first profile to the data device; and receiving an acknowledgment for the first connection from the data device.

The terminal may be configured to transmit a request or an acknowledgment for a connection between the terminal and the data device only in the first profile through an application stored in a memory of the terminal.

The method may further include searching for the data device in the second profile through setting of an operating system (OS) installed in the terminal before searching for the data device in the first profile; and registering the first information on the data device in the second profile.

In accordance with another aspect of the present disclosure, a method by a data device supporting Bluetooth connection of a first profile and a second profile for performing data communication with a terminal includes receiving a media access control (MAC) address of the terminal from the terminal having established a first connection of the first profile with the data device; disconnecting the first connection; and transmitting a request for a second connection of the second profile to the terminal through the MAC address of the terminal.

Preferably, the first profile may be Bluetooth low energy that does not support transmission and reception of data at a predetermined speed or over, and the second profile may be classic Bluetooth that supports the transmission and the reception of the data at the predetermined speed or over.

The method may further include performing the transmission and reception of the data with the terminal without reception of an acknowledgment for the second connection after transmitting the request for the second connection; and disconnecting the second connection after completing the transmission and reception of the data.

The method may further include receiving a request for the first connection in the first profile from the terminal before receiving the MAC address of the terminal; and transmitting an acknowledgment for the first connection to the terminal.

The method may further include switching the first profile and the second profile at predetermined intervals and waiting before receiving the request for the first connection.

The request for the first connection in the first profile received from the terminal may be received while the data device switches to the first profile and waits.

In accordance with still another aspect of the present disclosure, a data device supporting Bluetooth connection of a first profile and a second profile and performing communication with a terminal includes a transceiver module; and a processor, wherein the processor is configured to control the transceiver module to receive a media access control (MAC) address of the terminal from the terminal having established a first connection of the first profile with the data device, to disconnect the first connection, and to transmit a request for a second connection of the second profile to the terminal through the MAC address of the terminal.

Preferably, the first profile may be Bluetooth low energy that does not support transmission and reception of data at a predetermined speed or over, and the second profile may be classic Bluetooth that supports the transmission and the reception of the data at the predetermined speed or over.

The processor may be further configured to control the transceiver module to perform the transmission and reception of the data with the terminal without reception of an acknowledgment for the second connection after transmitting the request for the second connection, and to disconnect the second connection after completing the transmission and reception of the data.

The data device may further include a memory, wherein the processor may be further configured to control the transceiver module to perform the transmission and reception of the data with the terminal without reception of an acknowledgment for the second connection after transmitting the request for the second connection, and to disconnect the second connection after completing the transmission and reception of the data, and the processor may be further configured to control the memory to store the data therein.

The processor may be further configured to control the transceiver module to switch the first profile and the second profile at predetermined intervals and wait before receiving the request for the first connection.

The request for the first connection in the second profile received from the terminal may be received while the processor controls the transceiver module to switch to the second profile and wait.

In accordance with still another aspect of the present disclosure, an application performs the method, and it is stored in a memory of a terminal.

In accordance with still another aspect of the present disclosure, a terminal supporting Bluetooth connection of a first profile and a second profile and performing communication with a data device includes a transceiver module; a memory configured to store an application therein; and a processor, wherein the processor is configured to execute the application stored in the memory, and to perform the method by controlling the transceiver module and the memory.

Advantageous Effects

According to an embodiment of the present disclosure, the terminal and the data device supporting both BLE and BT classic can perform the Bluetooth transmission and reception of data of a predetermined capacity or over that is not easily transmitted through the BLE connection from the terminal to the data device through the iOS application capable of controlling only the BLE connection of the terminal.

Further, according to an embodiment of the present disclosure, the iOS application can control the BT classic connection between the terminal and the data device as the result of forcing the data device to make the BT classic connection with the terminal through the BLE connection through the iOS application capable of controlling only the BLE connection of the terminal.

MODE FOR INVENTION

Hereinafter, preferred embodiments of the present disclosure will be described in detail with reference to the accompanying drawings so that those of ordinary skill in the art can easily embody the technical idea of the present disclosure. The present disclosure can be implemented in various different forms, and thus it is not limited to the embodiments described herein.

Figure 1:
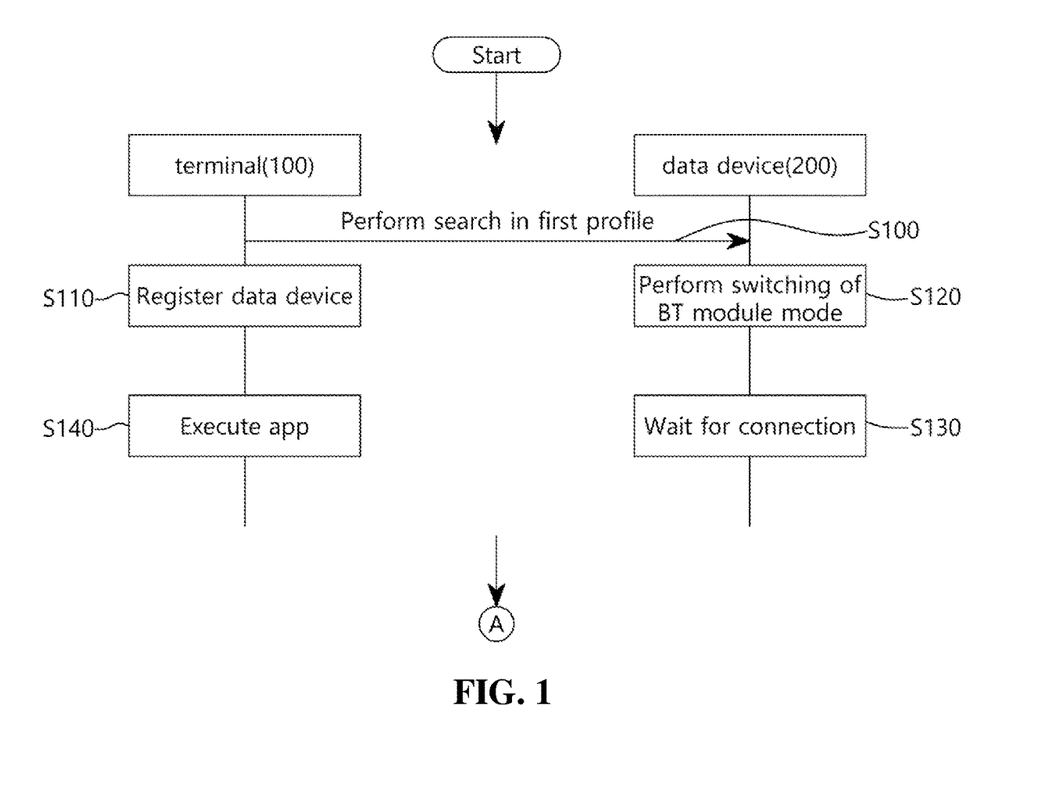
FIG. 1 is a diagram illustrating registration of a terminal for a data device according to an embodiment of the present disclosure.

FIG. 1 is a diagram illustrating registration of a terminal for a data device according to an embodiment of the present disclosure.

The present disclosure is for the purpose of a connection between a terminal 100 and a data device 200 in a BT classic mode through execution of an application rather than system setting.

The terminal 100 and the data device 200 may support a Bluetooth profile of Bluetooth low energy (BLE) or Bluetooth classic (BT classic).

The iOS operating system of Apple Inc. does not permit Bluetooth connection control in BT classic mode through execution of an application in accordance with the iAP protocol. The iOS operating system permits Bluetooth connection control in BLE mode through execution of the application. However, the communication speed of the BLE mode is considerably lower than the communication speed of the BT classic mode, and thus the BLE mode has the limitations that it is not easy to perform data transmission over a predetermined capacity. Accordingly, in order for a user to smoothly perform data transmission over a predetermined capacity to the extent that the user does not feel any inconvenience, the BT classic mode connection is necessary.

However, other operating systems including Android of other companies including Google excluding the iOS operating system of Apple Inc. do not have such limitations.

Accordingly, in the case where the terminal 100 intends to smoothly perform data communication with the data device 200 over a predetermined capacity, it may initially attempt to connect to the data device 200 in the BT classic mode.

With reference to FIG. 1, the terminal 100 initially searches for the data device 200 through the system setting in the BT classic mode (S100). The terminal 100 may register the searched data device 200 (S110). Through the registration (S110), the terminal may store, on system, information, such as BT name, MAC address, and PIN code, of the data device 200.

If the data device 200 is initially registered in the BT classic mode, it is not required to register the data device 200 again during the BT classic mode connection in the subsequent procedure. Further, if a connection request is received from the data device 200 in the BT classic mode through the information of the registered data device 200, the terminal 100 can directly identify the data device 200.

After the terminal 100 performs registration of the data device 200 in the BT classic mode, the data device 200 performs switching (S120) of Bluetooth (BT) module mode of the BT classic mode and the BLE mode at predetermined intervals, and it waits for the connection of the terminal 100 in each mode (S130). Further, although not illustrated, the data device 200 may initially wait for the connection of the terminal 100 in the BLE mode.

The terminal 100 starts the Bluetooth connection control through the application by executing the application (S140).

Figure 2:
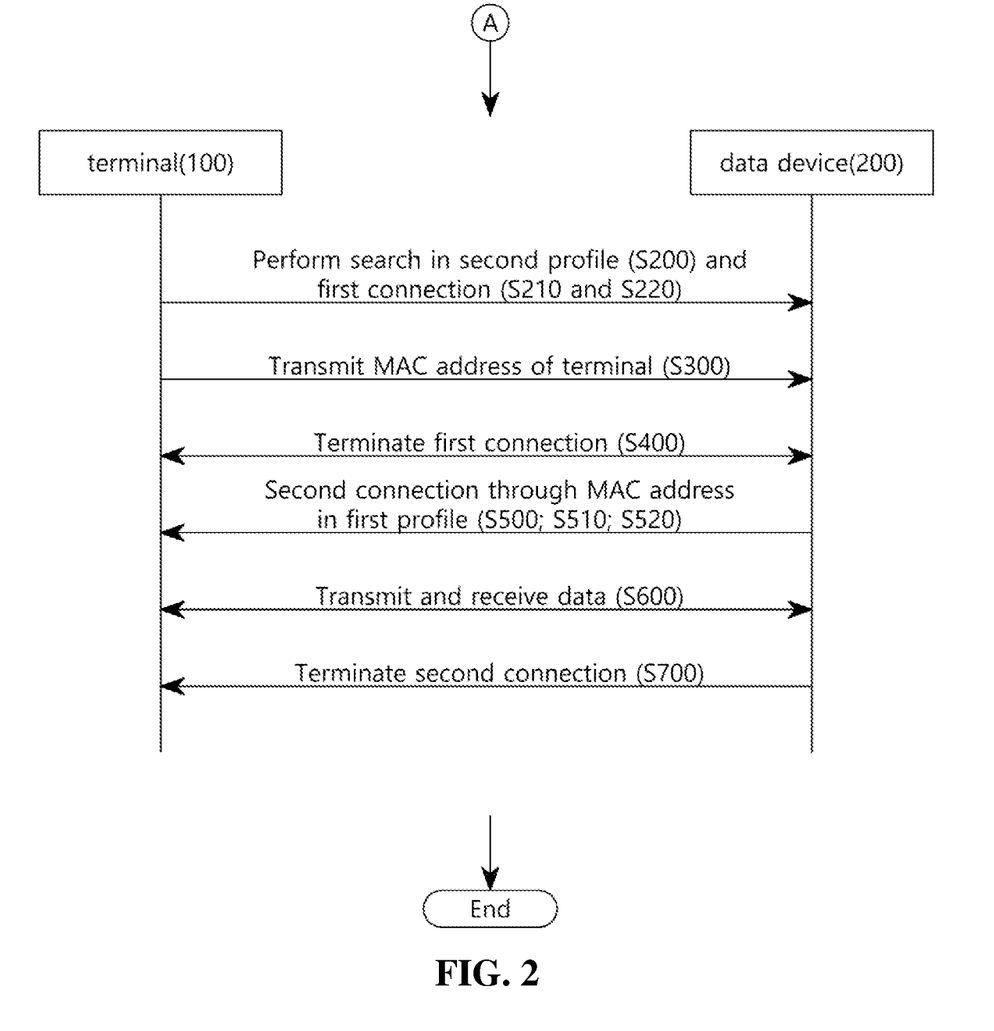
FIG. 2 is a diagram illustrating Bluetooth communication between a terminal and a data device according to an embodiment of the present disclosure.
Figure 3:
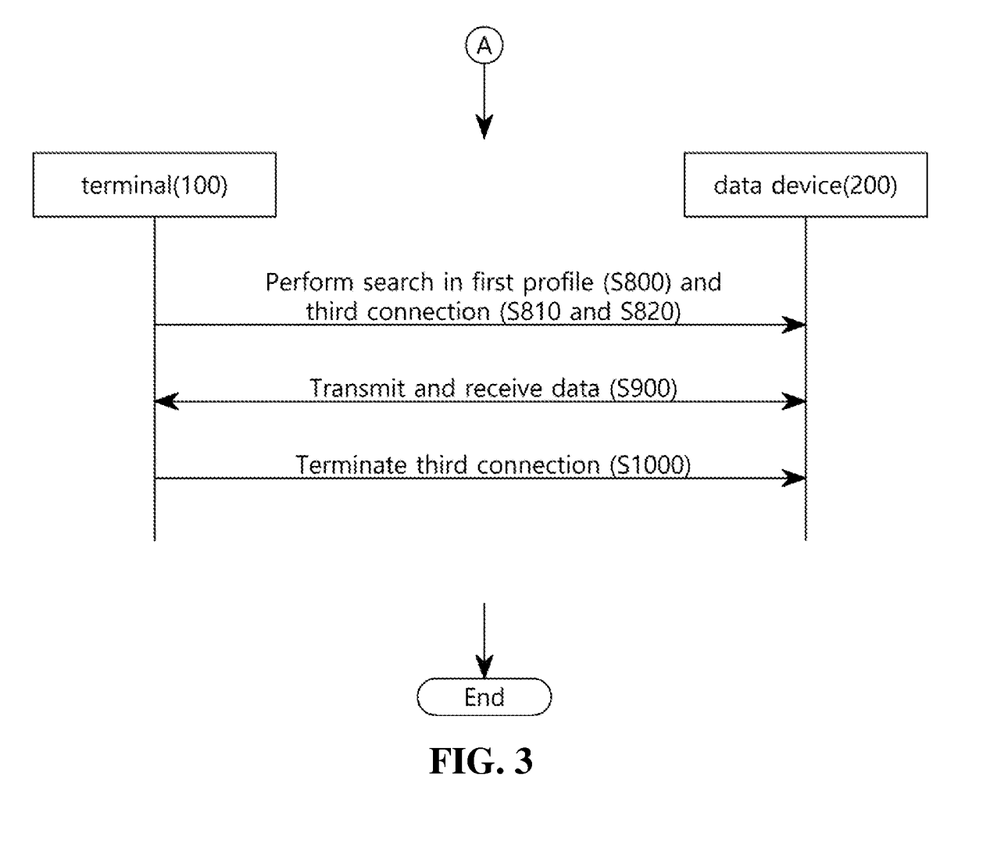
FIG. 3 is a diagram illustrating Bluetooth communication between a terminal and a data device according to an embodiment of the present disclosure.

Procedures after operation S140 will be described later with reference to FIGS. 2 and 3. FIG. 2 illustrates a procedure in the case where an iOS based application is installed in a terminal 100, and FIG. 3 illustrates a procedure in the case where an application based on another operating system, such as Android, excluding iOS is installed in a terminal 100.

FIG. 2 is a diagram illustrating Bluetooth communication between a terminal and a data device according to an embodiment of the present disclosure.

FIG. 2 illustrates a method for controlling a connection of a BT classic mode by an iOS based application in the case where the application is installed in the terminal 100. As described above, the iOS operating system of Apple Inc. does not permit BT classic mode connection control by the application. Accordingly, in order for the application to control the BT classic mode connection in the iOS operating system, it is required to control the BT classic mode connection through the data device 200. If the application can control the BT classic mode connection of the data device 200, this may result in that the application can control the BT classic mode connection of the terminal 100 in the same manner.

A procedure that is performed through execution of the application is as follows.

The terminal 100 transmits a request for a first connection to the data device 200 in the BLE mode (S210), and it receives an acknowledgment for the first connection in the BLE mode from the data device 200 (S220).

The terminal 100 transmits a MAC address of the terminal 100 to the data device 200 (S300). The MAC address is data having a size of a predetermined capacity or less capable of being smoothly transmitted to the extent that the user does not feel any inconvenience.

The terminal 100 terminates the first connection after transmitting the MAC address (S400). The iOS operating system permits the BLE mode connection control for the application, and thus the terminal 100 itself can terminate the first connection through the application.

That is, the first connection is a connection of the BLE mode that can be controlled by the application, and thus operations S200 to S400 may be performed under the control of the application installed in the terminal 100.

After terminating the first connection (S400), the terminal 100 may receive a request for a second connection in the BT classic mode from the data device 200 through the transmitted MAC address (S500).

Because the terminal 100 has registered information of the data device 200 in advance (S110), it may establish the second connection with the data device without any additional procedure, such as an acknowledgment for the second connection in the BT classic mode based on the registered information (S520).

Because the second connection has been established in the BT classic mode, the terminal 100 may transmit and receive data of a predetermined capacity or over with the data device 200 (S600).

Because the iOS operating system does not permit a control for disconnection of the BT classic mode connection of the application, the terminal 100 is unable to control the termination of the second connection through execution of the application. Accordingly, after the data transmission and reception is completed, the termination of the second connection is performed by the data device (S700).

FIG. 3 is a diagram illustrating Bluetooth communication between a terminal and a data device according to an embodiment of the present disclosure.

FIG. 3 illustrates a method for controlling a connection of a BT classic mode by an application based on another operating system, such as Android, excluding the iOS in the case where the application is installed in the terminal 100. As described above, in the other operating system including Android, there is no limit in the BT classic mode connection control through the application. Accordingly, in order for the application to control the BT classic mode connection in the other operating system, the application may directly control the BT classic mode connection without the necessity of bypassing the connection through the BLE mode as shown in FIG. 2.

A procedure that is performed through execution of the application is as follows.

The terminal 100 searches for the data device 200 in the BT classic mode (S800). The terminal 100 transmits a request for a third connection in the BT classic mode to the searched data device 200 (S810), and it receives an acknowledgment for the third connection in the BT classic mode from the data device 200 (S820).

Because the connection in the BT classic mode with the data device 200 has been established, the terminal 100 may directly transmit and receive data of a predetermined size or over with the data device 200.

The other operating system has no limits in controlling the disconnection of the BT classic mode connection of the application. Accordingly, the terminal 100 may control the termination of the third connection through execution of the application. After the data transmission and reception is completed (S900), the termination 100 disconnects the third connection (S1000).

Because the third connection is a connection of the BT classic mode that can be controlled by the application in the other operating system, operations S800 to S1000 may be performed under the control of the application installed in the terminal 100.

Figure 4:
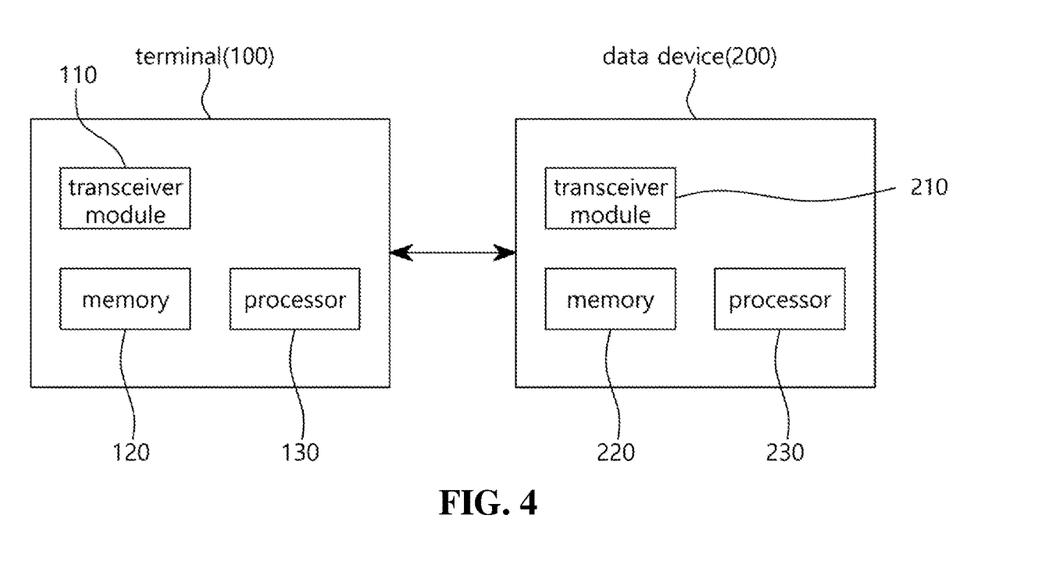
FIG. 4 is a diagram illustrating a terminal and a data device according to an embodiment of the present disclosure.

FIG. 4 is a diagram illustrating a terminal and a data device according to an embodiment of the present disclosure.

The terminal 100 includes a transceiver module 110, a memory 120, and a processor 130. The transceiver module 110 is connected to the processor 130 to transmit and/or receive a radio signal. The memory 120 stores therein applications and/or data. The processor 130 may be configured to implement procedures and/or methods proposed in the present disclosure through execution of the application stored in the memory 120.

The data device 200 includes a transceiver module 210, a memory 220, and a processor 230. The transceiver module 210 is connected to the processor 230 to transmit and/or receive a radio signal. The memory 220 is connected to the processor 230, and it stores therein various pieces of information related to an operation of the processor 230. The processor 230 may be configured to implement procedures and/or methods proposed in the present disclosure.

Although FIG. 4 illustrates only 1:1 communication environment between the terminal 100 and the data device 200, the communication environment may be constructed between a plurality of terminals and a plurality of data devices.

The processors 130 and 230 of each of the terminal 100 and the data device 200 instruct (e.g., control, adjust, and manage) the operations of the terminal 100 and the data device 200. The respective processors 130 and 230 may be connected to the memories 120 and 220 storing program codes and data. The memories 120 and 220 are connected to the processors 130 and 230, respectively, to store operating systems, applications, and general files.

The processors 130 and 230 according to the present disclosure may be called controllers, microcontrollers, microprocessors, or microcomputers. On the other hand, the processors 130 and 230 may be implemented by hardware or firmware, software, or a combination thereof.

In the case of implementing embodiments of the present disclosure using hardware, application specific integrated circuits (ASICs), digital signal processing devices (DSPDs), programmable logic devices (PLDs), and field programmable gate arrays (FPGAs), which are configured to perform the present disclosure, may be provided in the processors 130 and 230.

According to the above-described embodiments, constituent elements and features of the present disclosure are combined in a specific form. Unless explicitly mentioned, the respective constituent elements and the features should be considered as being selective. The respective constituent elements or the features may be embodied in the form in which they are not combined with other constituent elements and/or features. Further, some constituent elements and/or features may be combined with each other to configure an embodiment of the present disclosure. The order of operations explained in embodiments of the present disclosure may be changed. Partial configurations or features of any one embodiment may be included in another embodiment, or they may be replaced by configurations or features corresponding to another embodiment. It is apparent that an embodiment may be configured by combining claims that are not in an explicitly cited relationship or a new claim may be included by amendment after application.

Embodiments of the present disclosure may be implemented by various means for hardware, firmware, software, or a combination thereof. In the case where embodiments of the present disclosure are implemented by hardware, they may be implemented by at least one application specific integrated circuit (ASIC), digital signal processor (DSP), digital signal processing device (DSPD), programmable logic device (PLD), field programmable gate array (FPGA), processor, controller, microcontroller, or microprocessor.

In the case where embodiments of the present disclosure are implemented by firmware or software, they may be implemented by modules performing functions or operations, procedures, or functions. Software codes may be stored in a memory unit, and then they may be driven by a processor. The memory unit may be located inside or outside the processor to receive data from the processor through the various known means.

It will be apparent to those of ordinary skill in the art to which the present disclosure pertains that the present disclosure can be embodied in different forms without departing from the technical idea and essential features of the present disclosure. Accordingly, the above-described embodiments are not limited, but they should be considered in all exemplary aspects. The scope of the present disclosure should be determined by reasonable interpretations of the appended claims and all possible changes within the equivalent range of the present disclosure.

What is claimed is:

1. A method for performing communication with a data device by a terminal supporting Bluetooth connection, the method comprising:
    searching, by the terminal, for the data device in a Bluetooth (BT) classic mode that supports transmission and reception of data at a predetermined speed or over;
    registering, by the terminal, the data device in the BT classic mode and storing first information of the data device;
    performing, by the data device, switching of the BT classic mode and a Bluetooth low energy (BLE) mode at predetermined intervals and waiting for the Bluetooth connection of the terminal in each mode, wherein the BLE mode does not support the transmission and the reception of the data at the predetermined speed or over;
    starting, by the terminal, a control of the Bluetooth connection through an application installed in the terminal by executing the application;
    transmitting, by the terminal, a request for a first connection in the BLE mode to the data device, and receiving an acknowledgment for the first connection from the data device;
    transmitting, by the terminal, a media access control (MAC) address of the terminal to the data device having established the first connection in the BLE mode with the terminal;

disconnecting, by the terminal, the first connection in the BLE mode after transmitting the MAC address;

receiving, by the terminal, a request for a second connection in the BT classic mode from the data device through the MAC address of the terminal;

identifying, by the terminal, the data device using the stored first information; and establishing the second connection in the BT classic mode without transmission of an acknowledgment for the second connection by the terminal;

performing, by the terminal, transmission and reception of the data with the data device after establishing the second connection in the BT classic mode; and disconnecting, by the data device, the second connection in the BT classic mode after completing the transmission and reception of the data.

2. The method of claim 1, wherein the terminal is configured to transmit a request or an acknowledgment for a connection between the terminal and the data device only in the BLE mode through the application stored in a memory of the terminal.

3. A method for performing data communication with a terminal by a data device supporting Bluetooth connection, the method comprising:

searching, by the terminal, for the data device in a Bluetooth (BT) classic mode that supports transmission and reception of data at a predetermined speed or over;

registering, by the terminal, the data device in the BT classic mode and storing first information of the data device;

performing, by the date device, switching of the BT classic mode and a Bluetooth low energy (BLE) mode at predetermined intervals and waiting for the Bluetooth connection of the terminal in each mode, wherein the BLE mode does not support the transmission and the reception of the data at the predetermined speed or over;

starting, by the terminal, a control of the Bluetooth connection through an application installed in the terminal by executing the application;

receiving, by the data device, a request for a first connection in the BLE mode from the terminal, and transmitting an acknowledgment for the first connection to the terminal;

receiving, by the data device, a media access control (MAC) address of the terminal from the terminal having established the first connection in the BLE mode with the data device;

disconnecting, by the terminal, the first connection in the BLE mode after receiving the MAC address; and transmitting, by the data device, a request for a second connection in the BT classic mode to the terminal through the MAC address of the terminal;

identifying, by the terminal, the data device using the stored first information; and establishing the second connection in the BT classic mode without reception of an acknowledgment for the second connection by the data device;

performing, by the data device, transmission and reception of the data with the terminal after establishing the second connection in the BT classic mode; and disconnecting, by the data device, the second connection in the BT classic mode after completing the transmission and reception of the data.

4. The method of claim 3, wherein after performing the switching of the BT classic mode and the BLE mode at the predetermined intervals, the data device waits until receiving the request for the first connection.

5. The method of claim 4, wherein the request for the first connection in the BLE mode is received while the data device waits after switching to the BLE mode.

6. A data device supporting Bluetooth connection and performing communication with a terminal, the data device comprising:

a transceiver module; and a processor, wherein the processor is configured to:

perform switching of a Bluetooth (BT) classic mode and a Bluetooth low energy (BLE) mode at predetermined intervals and wait for the Bluetooth connection of the terminal in each mode, wherein the BT classic mode supports transmission and reception of data at a predetermined speed or over and the BLE mode does not support the transmission and the reception of the data at the predetermined speed or over;

control the transceiver module to receive a request for a first connection in the BLE mode from the terminal, transmit an acknowledgment for the first connection to the terminal, receive a media access control (MAC) address of the terminal from the terminal having established the first connection in the BLE mode with the data device, so as to disconnect the first connection after receiving the MAC address, and to transmit a request for a second connection in the BT classic mode to the terminal through the MAC address of the terminal;

establish the second connection in the BT classic mode without reception of an acknowledgment for the second connection;

control the transceiver module to perform transmission and reception of the data with the terminal after establishing the second connection in the BT classic mode, and disconnect the second connection in the BT classic mode after completing the transmission and reception of the data.

7. The data device of claim 6, wherein the processor is further configured to control the transceiver module to wait until receiving the request for the first connection after performing the switching of the BT classic mode and the BLE mode at the predetermined intervals.

8. The data device of claim 7, wherein the request for the first connection in the BLE mode is received while the processor controls the transceiver module to wait after switching to the BLE mode.

* * * * *